(12) United States Patent
Akema et al.

(10) Patent No.: US 6,514,024 B2
(45) Date of Patent: Feb. 4, 2003

(54) CLIP HAVING RETENTION MEMBERS

(75) Inventors: Tsuyoshi Akema, Toyohashi (JP); Takashi Umezawa, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/922,908

(22) Filed: Aug. 6, 2001

(65) Prior Publication Data

US 2002/0026693 A1 Mar. 7, 2002

(30) Foreign Application Priority Data

Sep. 7, 2000 (JP) .................................... 2000-271206

(51) Int. Cl.⁷ ................................................ F16B 13/06
(52) U.S. Cl. ........................ 411/48; 411/41; 411/60.1; 411/908
(58) Field of Search ............................. 411/41, 45, 46, 411/48, 60.1, 908

(56) References Cited

U.S. PATENT DOCUMENTS

| | | | | |
|---|---|---|---|---|
| 4,874,276 A | * | 10/1989 | Iguchi | 411/41 X |
| 5,370,484 A | * | 12/1994 | Morikawa et al. | 411/48 |
| 5,632,581 A | * | 5/1997 | Hasada | 411/48 |
| 5,850,676 A | | 12/1998 | Takahashi et al. | |

FOREIGN PATENT DOCUMENTS

| | | |
|---|---|---|
| JP | 6418612 | of 1989 |
| JP | 907323 | of 2000 |
| WO | 9512762 | of 1995 |

\* cited by examiner

*Primary Examiner*—Neill Wilson
(74) *Attorney, Agent, or Firm*—Edward D. Murphy

(57) ABSTRACT

A clip 1 includes both a pin 7 having a flange 10 and a shank 11, and a bush 9 having a flange 13 and a shank 14 with the bush 9 having a hollow configuration to receive the shank of the pin 11. The shank of the bush is inserted into holes of a plurality of attachment members to be connected with each other. Then, the shank of the pin is inserted into the hollow shank of the bush to enlarge the diameter of the shank of the bush so as to connect the attachment members each other by the enlarged shank of the bush and the flange of the bush. The shank of the bush 14 includes a plurality of longitudinally extending legs 31 which are divided in the circumferential direction of the shank of the bush. Each of the legs 31 includes a thin wall portion, which extends longitudinally from the root portion of the leg adjacent to the flange of the bush to the intermediate portion 34 of the leg. The thin wall potion has a thickness less than that of the other leg portion extending longitudinally from the intermediate portion 34 to the end of the leg. Each of the legs 31 is formed with a slit 37 extending from the root portion to substantially the intermediate portion and having a length greater than the maximum thickness of the attachment members.

1 Claim, 6 Drawing Sheets

CLIP HAVING RETENTION MEMBERS

BACKGROUND OF THE INVENTION

The present invention relates to a clip comprising a pin and a bush to connect attachment members such as two panels each other.

A clip has been well known which comprises a pin and a bush, wherein a shank of the bush is inserted into holes of attachment members such as two panels to be connected with each other, and then a shank of the pin is inserted into the hollow shank of the bush to enlarge the diameter of the shank of the bush so as to connect the attachment members each other by the enlarged shank of the bush and the flange of the bush. This clip can connect the attachment members to each other only by inserting and pushing the shank of the bush into the holes of the attachment members, which facilitates a fastening operation. In many conventional clips, where the range for panel thickness is widened, a plurality of thick panels can be connected with each other by the enlarged portion of the shank of the bush and the flange of the bush. However, if the panels are relatively thin, the root portion of the shank of the bush cannot be substantially enlarged in its diameter. Consequently, the panels are not sufficiently connected with each other so that the panels tend to be floated from each other. Where the shank of the bush is made longer for the thick panels, the length from the bottom surface of the panels to the end of the bush becomes redundantly long for the thinner panels. Thus, the shank of the bush cannot be maintained in a sufficient stiffness, resulting in lowered resistance to coming-off of the clip. For widening the range for the panel thickness, it has been required to prepare many kinds of clips having various lengths, each matching with a particular panel thickness. In view of this problem, the applicant has developed a clip capable of providing reliable connection and widening the range for the panel thickness.

One type of prior art clip allows a single kind of clip to be applied to a wide range of panel thickness with reliable connection. This clip can connect attachment members each other, for example, two panels, by moving the shank of the pin from a non-diameter enlargement connection position that the shank of the pin is inserted into the shank of the bush and the pin is connected with the bush while keeping the shank of the bush not to be enlarged in its diameter by the shank of the pin, to a diameter enlargement connection position that the shank of the pin is further inserted into the shank of the bush and the end of the shank of the bush is enlarged in its diameter by the end of the shank of the pin. In a fastening operation of this clip, it has been found that an operation for pushing the pin to the diameter enlargement connection position was simple but necessary to push the pin with relatively strong force, which somewhat imposed a burden on operators.

Another type of prior art clip allows for connecting attachment members to each other by moving the shank of the pin from a non-diameter enlargement connection position, that the shank of the pin is inserted into the shank of the bush and the pin is connected with the bush while keeping the shank of the bush not to be enlarged in its diameter by the shank of the pin, to a diameter enlargement connection position, that the shank of the pin is further inserted into the shank of the bush and the end of the shank of the bush is enlarged in its diameter by the end of the shank of the pin. However, since the shank of the bush of this clip is not divisible, it is necessary to make the shank of the pin long. Another type of clip has a cap that is covered over an anchor leg clip. Although this clip has the cap, there is, in this clip, no suggestion for the combination of the pin and the bush to connect panels by pushing the pin into the bush. Further, U.S. Pat. No. 5,850,676 discloses a clip for connecting two panels to each other by moving the shank of the pin from a non-diameter enlargement connection position that the shank of the pin is inserted into the shank of the bush and the pin is connected with the bush while keeping the shank of the bush not to be enlarged in its diameter by the shank of the pin, to a diameter enlargement connection position so that the shank of the pin is further inserted into the shank of the bush and the end of the shank of the bush is enlarged in its diameter by the end of the shank of the pin. Since the shank of the bush of this clip is not divisible, it is necessary to make the shank of the pin long.

SUMMARY OF THE PRESENT INVENTION

According to the present invention, the shank of the bush may be deformed at its root portion to enlarge in its diameter, so that even in thin panels, the panels can be connected with high connecting force to prevent the panels from floating from each other with any undesirable gap between the panels. This provides high resistance to coming-off of the clip and thereby eliminates the needs for making the shank long. Further, the slits provided in each leg allows the load in the operation for pushing the pin to be significantly lowered so as to lighten the load for operators in the fastening operation.

It is therefore an object to provide a clip capable of achieving a sufficient connection force for both thick panels and thin panels even if the clip is required to widen the range for the panel thickness, and capable of allowing its pin to be pushed with a light insertion load in a fastening operation.

In order to achieve this object, according to the present invention, there is provided a clip comprising a pin including a flange and a shank, and a bush including a flange and a shank with the bush having a hollow configuration to receive the shank of the pin, wherein the shank of the bush is inserted into holes of a plurality of attachment members such as panels to be connected with each other, and then the shank of the pin is inserted into the hollow shank of the bush to enlarge the diameter of the shank of the bush so as to connect the attachment members each other by means of the enlarged shank of the bush and the flange of the bush. The clip is characterized in that the shank of the bush includes a plurality of longitudinally extending legs which are divided in the circumferential direction of the shank of the bush; each of the legs includes a thin wall portion, the thin wall portion extending longitudinally from the root portion of the leg adjacent to the flange of the bush to the intermediate portion of the leg with the thin wall portion having a thickness less than that of the other portion extending longitudinally from the intermediate portion to the end of the leg; and each of the legs is formed with a slit extending longitudinally from the root portion to substantially the intermediate portion with the slit having a length greater than the thickness of the attachment members. Thus, even in thin panels, the panels may be connected with desirably maintained high connecting force to prevent any undesirable gap between the panels. This provides high resistance to coming-off of the clip and thereby eliminates the needs for making the shank long. Further, the slits formed in each leg allows the load in the operation for pushing the pin to be significantly lowered, which may lighten the load for operators in the fastening operation.

Preferably, the above clip includes an engagement pawl adapted to engage with an engagement shoulder of the shank of the pin. In that case, the engagement pawl is formed inside each the thin wall portion of the legs of the shank of the bush and at each the root portion of the legs. The shank of the pin may further includes a first small-diameter portion formed at the end of the shank of the pin to receive each the engagement pawl of the legs, and a stopper shoulder formed closer to the end of the shank of the pin than the first small-diameter portion, so that the clip can be at a non-diameter enlargement connection position at which the shank of the pin is inserted into the shank of the bush and the pin flange is away from the flange of the bush with keeping the shank of the bush not to be enlarged in its diameter by the shank of the pin; and a second small-diameter portion formed at the root portion of the shank of the pin adjacent to the pin flange to form the engagement shoulder, and an engagement protrusion formed at each the end of the legs and protruding radially inward, so that the clip can be at a diameter enlargement connection position at which the shank of the pin is further inserted into the shank of the bush and the end of each the legs of the shank of the bush is enlarged in its diameter by the end of the shank of the pin while bringing the pin flange into contact with the flange of the bush, and wherein at the diameter enlargement connection position, the engagement pawl is into engagement with the engagement shoulder of the shank of the pin and the engagement protrusion is into engagement with the first small-diameter portion, so as to make each the end of the legs protrude radially outward. Furthermore, when the pin and the bush are at the diameter enlargement connection position, the pin flange and the flange of the bush may be adapted to have a given clearance therebetween around the entire pin flange.

BRIEF DESCRIPTION OF THE ACCOMPANYING DRAWINGS

DETAILED DESCRIPTION OF THE INVENTION

Figure 10:
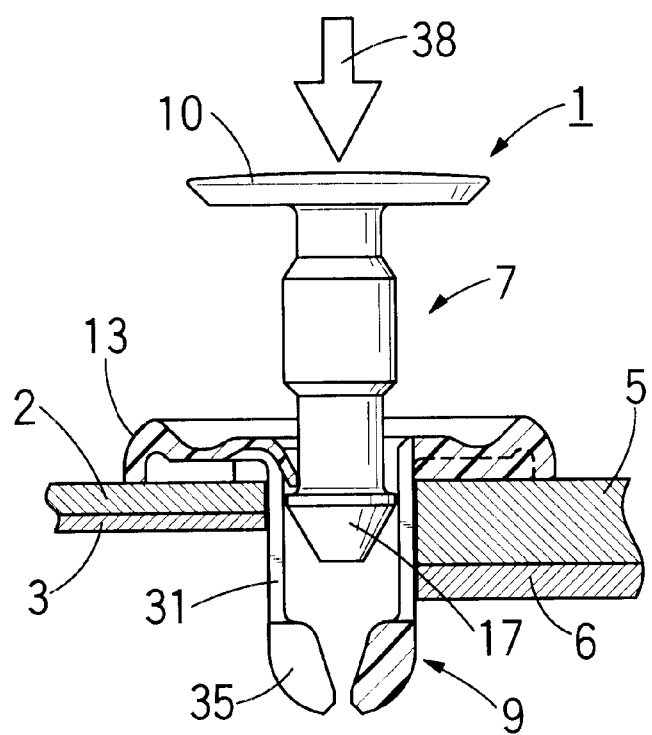
FIG. 10 is a partial sectional front view of the clip according an embodiment of the present invention and two panel at the non-diameter enlargement connection position, before the panels are connected by using the clip.
Figure 11:
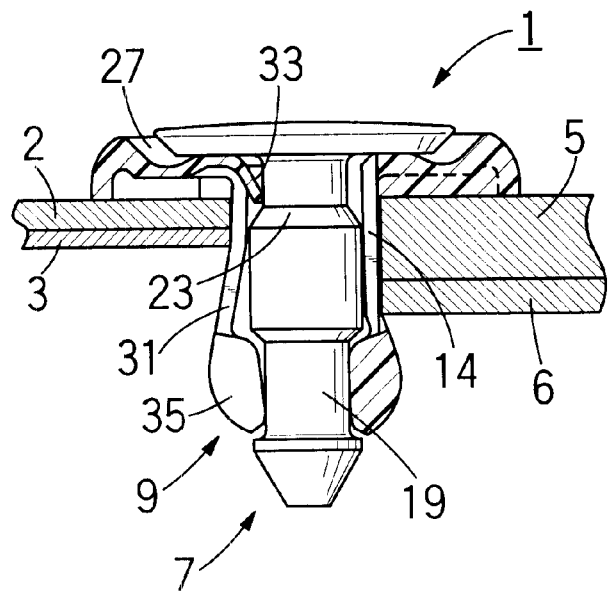
FIG. 11 is a sectional front view of the clip of FIG. 10 in a diameter enlargement connection position.
Figure 12:
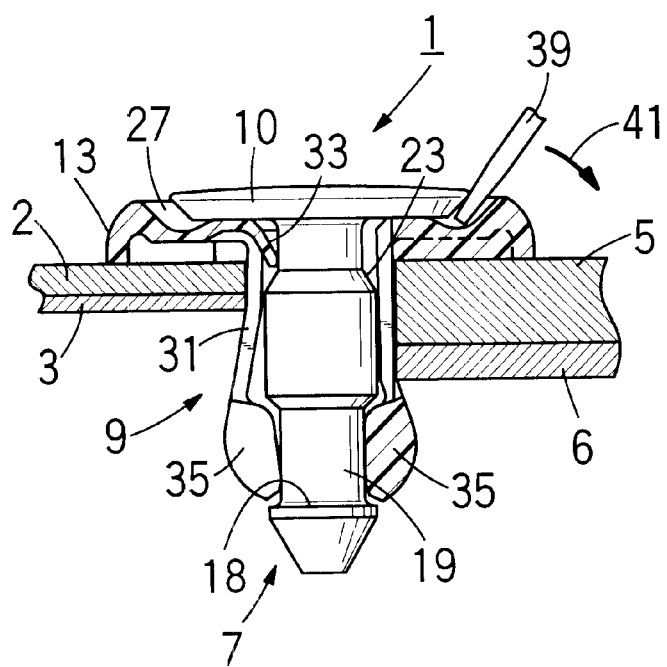
FIG. 12 is a sectional front view showing an operation for detaching the clip of FIG. 11 from the panels.

With reference to the drawings, an embodiment of the present invention will now be described. A structure of a clip 1 according to one embodiment of the present invention is shown in FIGS. 1 to 9. As shown in FIGS. 10 and 11, the clip 1 functions for connecting two panels 2, 3 (or 5, 6) as attachment members to be connected with each other. FIG. 12 shows an operation for detaching the clip 1 from the panels. For example, one of the panels is vehicle body, and the other is a panel section of a component to be mounted to the vehicle body. FIGS. 10 to 12 show different states when the panels are connected each other, wherein the thin panels 2, 3 and the thick panels 5, 6 are shown on the left side and right side in each Figure, respectively.

Figure 1:
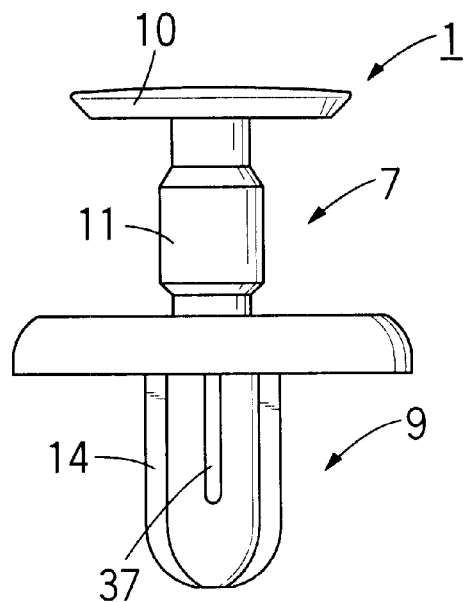
FIG. 1 is a front view of a clip according to an embodiment of the present invention, wherein the clip is located at a non-diameter enlargement connection position.
Figure 2:
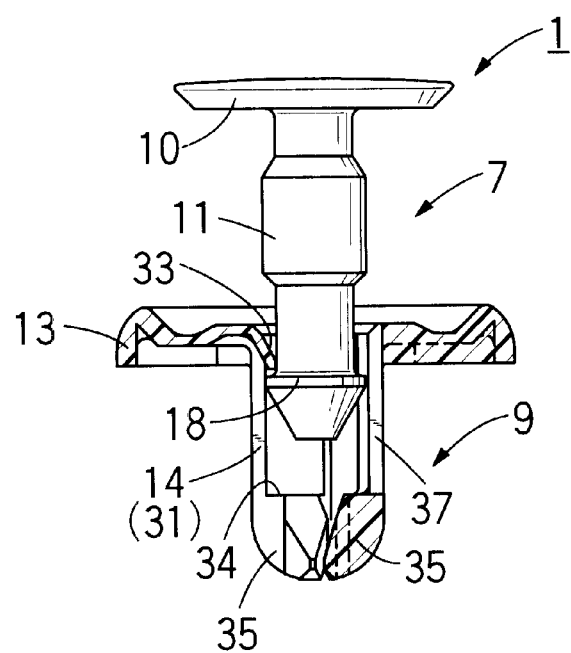
FIG. 2 is a longitudinal sectional view of the clip of FIG. 1.

In FIGS. 1 to 9, the clip comprises a pin 7 and a bush 9. Each of the pin 7 and the bush 9 is integrally formed of a plastic material. As shown in FIGS. 1 and 2, the pin 7 and the bush 9 are assembled to each other in a non-diameter enlargement. connection position that they are connected in a non-separation state from each other. The clip can be delivered to users as a finished product in which the pin 7 and the bush 9 are connected with each other to save labor for managing the pin and bush separately. The non-diameter enlargement connection position may also be defined as a position released from a diameter enlargement connection position that a shank of the bush is enlarged in its diameter, that is, the panels are connected with each other as shown in FIGS. 10 and 11. As shown in FIG. 10, for connecting the panels, the clip 1 at the non-diameter enlargement connection position is inserted into mounting holes of the thin panels 2, 3 or the thick panels 5, 6. When the pin 7 is pushed in the direction shown by the arrow in FIG. 10, the clip 1 is moved to the diameter enlargement connection position that the shank of the bush 9 is enlarged in its diameter as shown in FIG. 11 to connect the panels 2, 3 (or 5, 6) each other. A way how to release the connected panels is shown in FIG. 12. As shown FIGS. 1 to 4, the pin 7 includes a circular flange 10 and a shank 11 extending downward from the flange 10. As shown FIGS. 1, 2 and 5 to 9, the bush 9 includes a circular flange 13 and a shank 14 extending downward from the flange 13, and has a hollow configuration to receive the shank of the pin 11.

Figure 3:
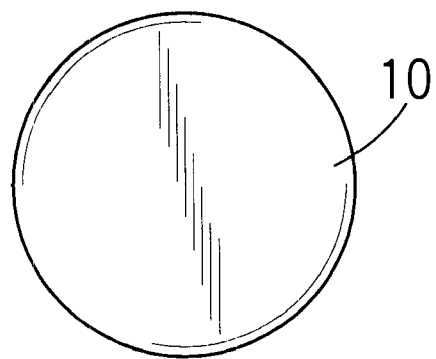
FIG. 3 is a plan view of a pin.
Figure 4:
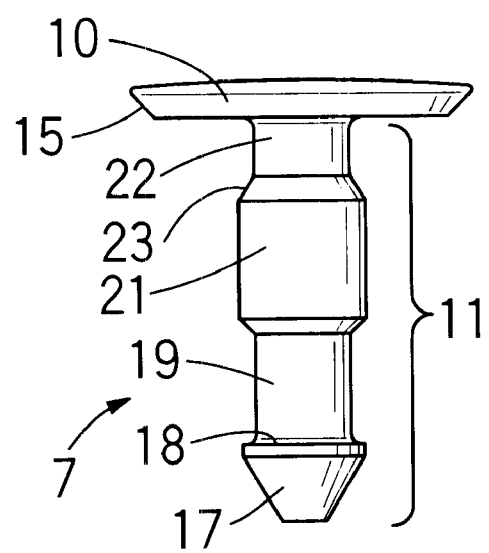
FIG. 4 is a front view of the pin.
Figure 5:
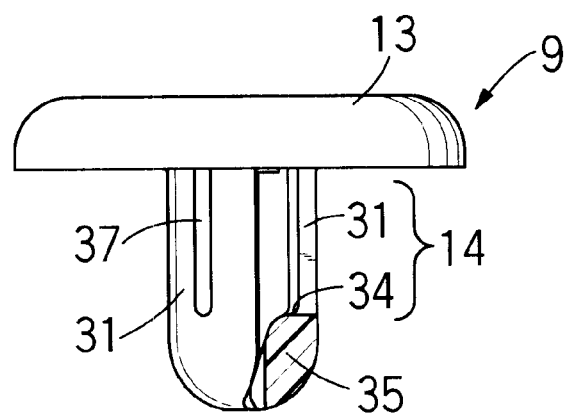
FIG. 5 is a partial sectional front view of a bush, wherein a half of a shank of the bush is shown as a longitudinal sectional view.
Figure 6:
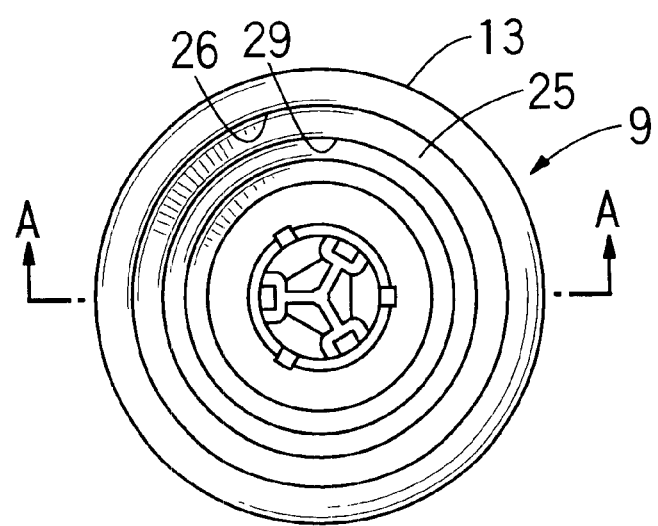
FIG. 6 is a plan view of the bush.
Figure 7:
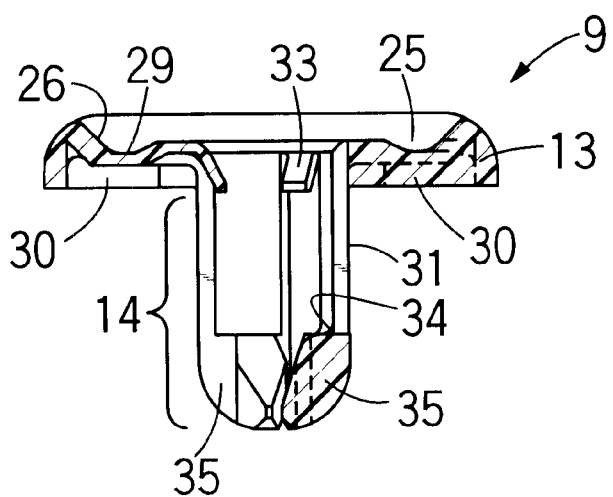
FIG. 7 is a longitudinal sectional view of the bush, taken along the line A—A of FIG. 6.
Figure 8:
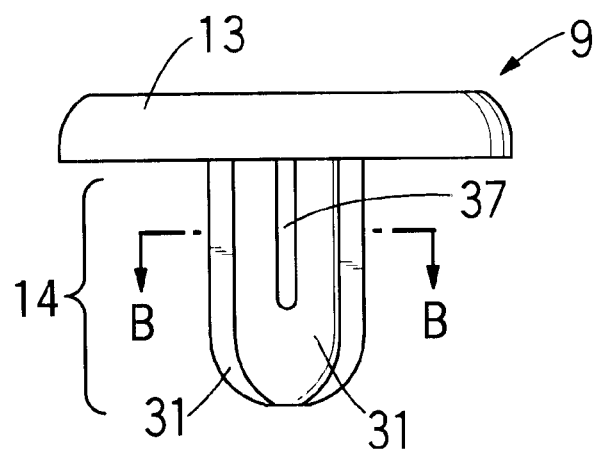
FIG. 8 is a right side view of the bush of FIG. 5.
Figure 9:
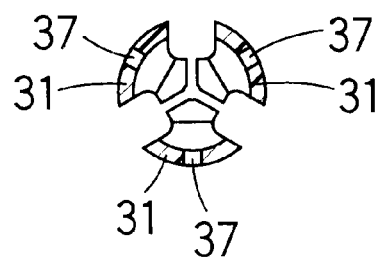
FIG. 9 is a cross sectional view of the shank of the bush, taken along the line B—B of FIG. 8.

With reference to FIGS. 3 and 4, the construction of the pin 7 will be described. The pin flange 10 is formed in an substantially circular plate. The outer peripheral edge of the pin flange does not extend vertically but has a cut extending downward with an inward slant to form a clearance for allowing a tip of a tool to be inserted into the clearance between the upper and lower portions of the flange. The shank of the pin 11 is formed in a rod shape extending from the end (lower end in FIG. 4) of the shank of the pin to the root portion of the shank of the pin adjacent to the flange 10. The end of the shank 10 is formed with a truncated-cone shaped engagement portion 17 which is tapered toward its terminal end and has a root portion having a lager diameter. The upper surface of the engagement portion 17 is formed in a flat surface perpendicular to the axial or longitudinal direction of the shank to provide a stopper shoulder 18. The stopper shoulder 18 is engaged with an engagement pawl (described later) provided in the shank of the bush 14 to keep in the non-diameter enlargement connection state as shown in FIG. 2. A first small-diameter portion 19 having a smaller diameter than the large-diameter portion of the engagement portion 17 is formed in the shank of the pin on the upper side of the stopper shoulder 18. The first small-diameter portion 19 has a length to allow an engagement protrusion (described later) of the shank of the bush to be contained therein at the diameter enlargement connection position (FIG. 11). The diameter of the small-diameter portion 19 is selected to make the end of the shank of the bush stretch sufficiently in the radially outward direction of the shank of the bush when the portion 19 engages with the engagement protrusion of the shank of the bush at the diameter enlargement connection position. A large-diameter portion 21 is formed in the shank of the pin on the upper side of the first diameter portion 19 to maintain the stiffness of the shank of the pin 11 and to prevent the shank of the bush from being deformed radially inward in a panel connection state (or at the diameter enlargement connection position). The root portion on the upper side of the large-diameter portion 21 and adjacent to the pin flange is formed as a second small-diameter portion 22. The engagement pawl (described later) provided in the shank of the bush 14 is contained in the second small-diameter portion 22 at the diameter enlargement connection position (FIG. 11). An engagement shoulder 23 is formed at the boundary of the second small-diameter portion 22 and the large-diameter portion 21 to allow the engagement pawl to be engaged therewith. The engagement shoulder 23 is formed not in a vertical surface but in an oblique surface to keep in engaging the engagement pawl with the engagement shoulder 23 at the diameter enlargement connection position in a normal condition and/or when a force for pulling out the clip is lower than a given level, and to allow the engagement pawl to be released from the engagement shoulder 23 when the pin 7 is pulled out with a strong force.

The bush 9 will be described in detail with reference to FIGS. 5 to 9. The flange of the bush 13 is formed in an substantially circular plate shape having a larger diameter than the pin flange 10. A circular concave portion 25 is formed in the upper portion of the flange of the bush to receive the pin flange 10. The concave portion 25 has a diameter slightly larger than that of the pin flange 10 to form a clearance 27 (FIG. 11) for allowing the tip of a tool such as a screw driver to be inserted into the clearance between the outer peripheral edge 15 of the pin flange 10 and the inner peripheral edge 26 of the concave portion 25 when the pin flange 13 is received in the concave portion 25. Further, a relatively deep annular groove 29 is formed on the bottom surface of the concave portion 25 adjacent to the peripheral edge to form a space for receiving the tip of the tool, such as a screw driver, inserted from the clearance 27, which facilitates an operation for levering up or separating the pin flange from the flange of the bush 13. Preferably, two to four ribs 30 extending radially is provided on the under surface of the flange of the bush to reinforce the flange of the bush.

As shown in FIGS. 5 and 7 to 9, the shank of the bush 14 is composed of a plurality of longitudinally extending legs 31 as divided in the circumferential direction of the shank of the bush. In the illustrated example, the number of the legs is three. Forming the shank of the bush 14 with the plurality of legs 31 allows the shank of the bush to be readily enlarged in its diameter when the shank of the pin 11 is inserted into the shank of the bush 14. A flexible engagement pawl 33 is provided on the inner surface of the shank of the bush 14, at the root portion of the shank of the bush adjacent to the flange of the bush and at a position without affection due to enlarging the shank of the bush in its diameter. The engagement pawl 33 extends radially inward between the adjacent legs 31, 31 and toward each end of the legs. Each leg 31 includes a thin wall portion, which extends longitudinally from the root portion of the leg adjacent to the flange of the bush 13 to the intermediate portion 34 of the leg. The thin wall portion has a thickness less than that of the other leg portion extending longitudinally from the intermediate portion 34 to the end of the leg. The leg portion extending longitudinally from the intermediate portion 34 to the end protrudes radially inward to form a thick wall serving as the engagement protrusion 35. The radial thickness of the engagement protrusion 35 is selected to allow the legs 31 to be sufficiently deformed when the engagement protrusion 35 is engaged with the first small-diameter portion 19 of the shank of the pin 11 at the diameter enlargement connection position (FIG. 11).

As described above, each leg 31 includes the thin wall portion extending from the root portion adjacent to the flange of the bush 13 to the intermediate portion 34 and having a thickness less than that of the other leg portion extending longitudinally from the intermediate portion 34 to the end. Thus, both in connecting the thick panels 5, 6 shown on the right side in FIG. 10 and in connecting the thin panels 2, 3 shown on the left side of FIG. 10, the engagement protrusion 35 at each end of the legs 31 is enlarged in its diameter to reliably connect the panels as seen at the diameter enlargement connection position in FIG. 11. The operation for pushing the pin to the diameter enlargement connection position is relatively simple, but a strong pushing force is necessary to complete the operation. Particularly in the operation for connecting the thick panels 5, 6, some burden is imposed on operators when the engagement portion 17 at the end of the shank of the pin 11 surmounts the engagement protrusion 35 at each end of the legs. In the present invention, each of the legs 31 is formed with a slit 37 extending longitudinally from the root portion (the portion adjacent to the flange of the bush) of the shank of the bush 14 to substantially the intermediate portion 34. Thus, when the shank of the pin 11 is inserted into the shank of the bush 14, the engagement protrusion 35 of each leg 31 is readily and sufficiently protruded radially outward, which provides increased connecting force and lightened load for operators in the operation of pushing the clip. The slits are arranged to have a longer length than the total thickness from the flange of the bush to the attachment members (panels) and than the maximum thickness of the attachment members to be connected with each other. In an actual example, the setting load for pushing the clip from the state in FIG. 10 to the diameter enlargement connection position could be reduced in the range of 20% to 25% compared to a conventional setting load. Thus, even if the clip is required to widen the range of applicable thickness of panels as the attachment members, a high connection force and reduced pushing force can be achieved without increasing the length of the shank of the bush.

In order to allow the clip 1 to take the non-diameter enlargement connection position in FIGS. 1 and 2 or the diameter enlargement connection position in FIG. 11, the stopper shoulder 18 and the engagement shoulder 23 are formed at the end and root portion of the shank of the pin 11, respectively, and the engagement pawl 33 is formed at the root portion of the shank of the bush 14. At the non-diameter enlargement connection position in FIG. 2, the engagement pawl 33 engages with the stopper shoulder 18 to prevent the pin 7 from coming-off from the bush 9. At the diameter enlargement connection position in FIG. 11, the engagement pawl 33 engages with the engagement shoulder 23 to retain the pin at the diameter enlargement connection position. Even if the shank of the bush has some deformation at the diameter enlargement connection position during long-standing connection state, the engagement pawl 33 can keep the same state because the engagement pawl 33 is located at the position without affection of enlarging the shank of the bush in its diameter. Thus, for replacement parts, components or the like, after the shank of the pin 11 is pulled and moved to the non-diameter enlargement connection position, the engagement pawl 33 is restricted by the stopper shoulder 18 and thereby the bush is reliably pulled out of the panels with the pin even if it is tried to pull the pin 7 out of the bush 9. Thus, when the clip is detached for replacement or the like after long-term use, both the pin 7 and the bush 9 will be removed from the panels.

With reference to FIGS. 10 to 12, an operation for connecting the thin panels 2, 3 (or thick panels 5, 6) by use of the clip 1 will be described. As shown in FIG. 10, the leg 31 of the shank of the bush of the clip 1, in which the pin 7 is connected with the bush 9 at the non-diameter enlargement connection position, is inserted into the mounting holes of the panels 2, 3 (or 5, 6) to bring the flange of the bush 13 into contact with the panel 2 (or panel 5). Under that condition, when the pin flange 10 is pushed in the direction indicated by the arrow 38 with fingers or the like, the lip 1 is moved to the diameter enlargement connection position that each engagement protrusion 35 of the legs 31 of bush 7 shown in FIG. 11 is radially protruded. Thus, each leg 31 is enlarged in its diameter, and the panels 2, 3 (or panels 5, 6) are connected with each other by the enlarged legs and the flange of the bush 13. In this pushing operation, while a certain force is necessary when the large-diameter portion of the engagement portion 17 at the end of the shank of the pin 11 climbs over each engagement protrusion 35 of the legs 31, the operation is completed with a small insertion force (or light setting load) and the insertion force could be reduced in the range of 20% to 25% compared to conventional clips. At the diameter enlargement connection position in FIG. 11, since the engagement pawl 33 of the shank of the bush engages the engagement shoulder 23 of the shank of the pin, the diameter enlargement connection position is kept in the same state and thereby the panels 2, 3 (or 5, 6) are held in the connected state.

In order to release the connection between the panels 2, 3 (or 5, 6) for replacement or trouble-shooting, as shown in FIG. 12, when the tip 39 of the tool, such as a screw driver, is inserted into the annular clearance 27 between the outer peripheral edge and the peripheral edge of the concave of the flange of the bush 13 and is rotated in the direction indicated by the arrow 41, the engagement pawl 33 and the engagement protrusion 35 surmount or climb over the engagement shoulder 23 and the stopper shoulder 18, respectively. Then, the clip is returned to the non-diameter enlargement connection position by further pulling up the pin flange. Thus, the clip 1 can be completely pulled out of the panels 2, 3 (or 5, 6) with keeping in the connection between the pin 7 and the bush 9 to release the connection between the panels.

In general, the above-identified embodiments are not to be construed as limiting the breadth of the present invention. It is understood that other modifications or other alternative constructions will be apparent which are within the scope of the invention as defined in the appended claims.

What is claimed is:

1. A clip having retention members and to connect a plurality of attachment members comprising:

a. a pin including a flange and a shank;

b. a bush including a flange and a shank with the bush having a hollow configuration to receive the shank of the pin;

c. the shank of the bush is inserted into holes formed in the attachment members to connect the members to each other;

d. the shank of the pin is inserted into the hollow shank of the bush to enlarge the diameter of the shank so as to connect the attachment members each other by means of the enlarged shank of the bush and the flange;

e. the shank of the bush includes a plurality of longitudinally extending legs which are divided in the circumferential direction of the shank of the bush;

f. each of the legs includes a thin wall portion that extends longitudinally from the root portion of the leg adjacent to the flange of the bush to the intermediate portion of the leg and the thin wall portion has a thickness less than that of the other portion extending longitudinally from the intermediate portion to the end of the leg;

g. each of the legs is formed with a slit extending longitudinally from the root portion to substantially the intermediate portion and the slit has a length greater than the thickness of the attachment members;

h. a first engagement pawl formed to extend inwardly on the inner side of the thin wall portion of each leg of the shank of the bush remote from the flange;

i. a second engagement pawl formed to extend inwardly from the flange of the bush;

j. an engagement shoulder formed on the shank of the pin to be yieldably engaged by the second engagement pawl upon the pin being fully inserted into the bush and to be released therefrom upon the pin being raised from the bush; and k. a stopper shoulder formed on the pin adjacent the end thereof remote from the flange thereof and whereby, upon the pin being raised, the second engagement pawl to engage the stopper shoulder normally to stop the pin from being removed from the bush.

\* \* \* \* \*